United States Patent [19]

Nankaku

[11] Patent Number: 4,926,338
[45] Date of Patent: May 15, 1990

[54] NUMERICAL CONTROL APPARATUS

[75] Inventor: Shigeki Nankaku, Aichi, Japan

[73] Assignee: Mitsubishi Denki Kabushiki Kaisha, Tokyo, Japan

[21] Appl. No.: 208,718

[22] Filed: Jun. 20, 1988

[30] Foreign Application Priority Data

| Jun. 19, 1987 | [JP] | Japan | 62-152871 |
| Jun. 19, 1987 | [JP] | Japan | 62-152872 |
| Jun. 19, 1987 | [JP] | Japan | 62-152876 |
| Jun. 30, 1987 | [JP] | Japan | 62-161111 |

[51] Int. Cl.$^5$ ............... G05B 19/24; B23B 39/26
[52] U.S. Cl. ............ 364/474.32; 364/474.18; 364/474.29
[58] Field of Search ........... 364/474.18, 474.2, 474.29, 364/474.32

[56] References Cited

U.S. PATENT DOCUMENTS

| 4,503,493 | 3/1985 | Burkhardt et al. | 364/170 |
| 4,621,959 | 11/1986 | Kishi et al. | 409/84 |
| 4,659,265 | 4/1987 | Kishi et al. | 409/84 |
| 4,706,201 | 11/1987 | Kishi et al. | 364/474 |
| 4,720,796 | 1/1988 | Kishi et al. | 364/474 |
| 4,764,873 | 8/1988 | Libby | 364/461 |
| 4,789,931 | 12/1988 | Kuragano et al. | 364/474.18 |

FOREIGN PATENT DOCUMENTS

| 0139009 | 8/1984 | European Pat. Off. . |
| 0160096 | 4/1985 | European Pat. Off. . |
| 2176911 | 1/1987 | United Kingdom . |

Primary Examiner—Jerry Smith
Assistant Examiner—Paul Gordon
Attorney, Agent, or Firm—Sughrue, Mion, Zinn, Macpeak & Seas

[57] ABSTRACT

A numerical control apparatus is capable of producing an offset figure for a machining tool, which include both approach and retract paths therefor based on input data for an ultimate machined shape and one wall category without need of providing various machining modes in an area machining or pocket machining.

9 Claims, 23 Drawing Sheets

FIG. 2(a) PRIOR ART
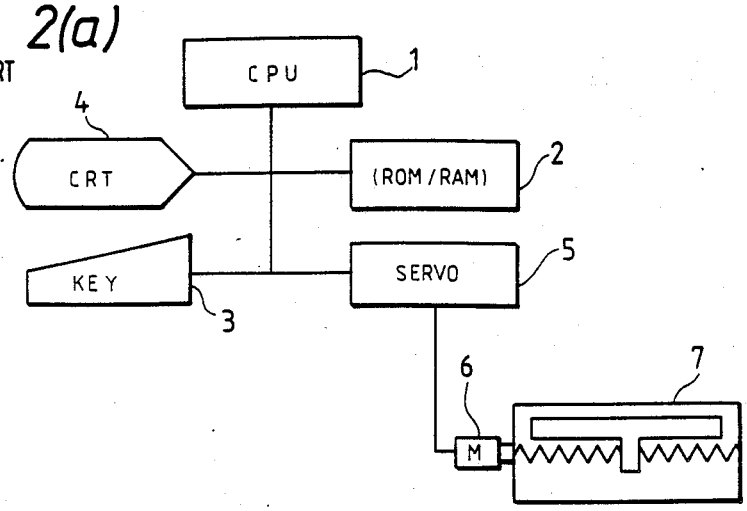
FIG. 2(b) PRIOR ART
| MACHINING TOOL | CLOSED | MACHINING CONDITION | | | |
|---|---|---|---|---|---|
| CONF. | X | Y | I | J | K |
| STRAIGHT LINE | 0 | 0 | | | |
| STRAIGHT LINE | 0 | 80 | | | |
| CW ARC | 80 | 0 | 20 | | |
| END | | | | | |
FIG. 2(c) PRIOR ART
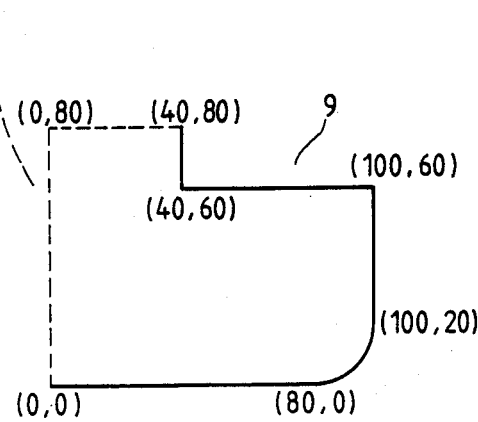

TO CONVEX POINT

TO SMOOTH PORTION

TO BOUNDARY

FIG. 9(a) PRIOR ART
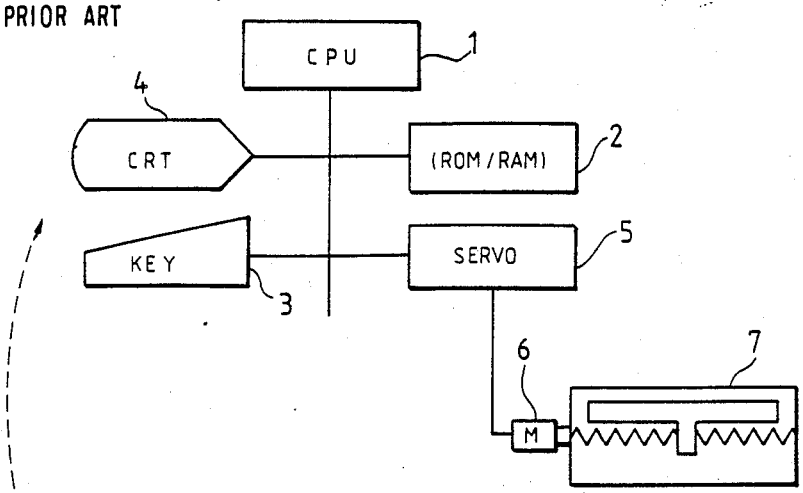
FIG. 9(b) PRIOR ART
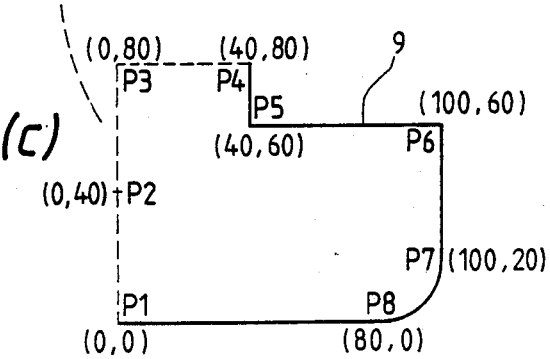
FIG. 9(c) PRIOR ART FIG. 15(a)
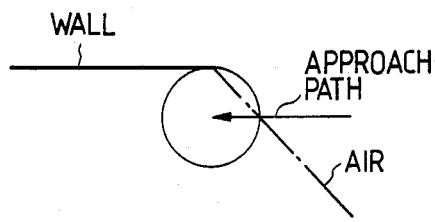
FIG. 15(d)
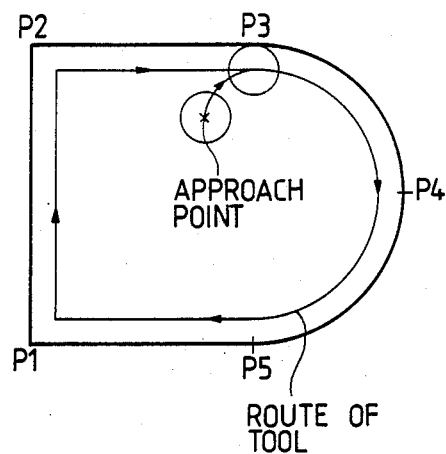
FIG. 15(b)
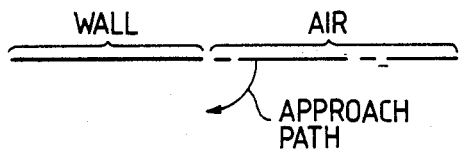
FIG. 15(c)
FIG. 15(e)
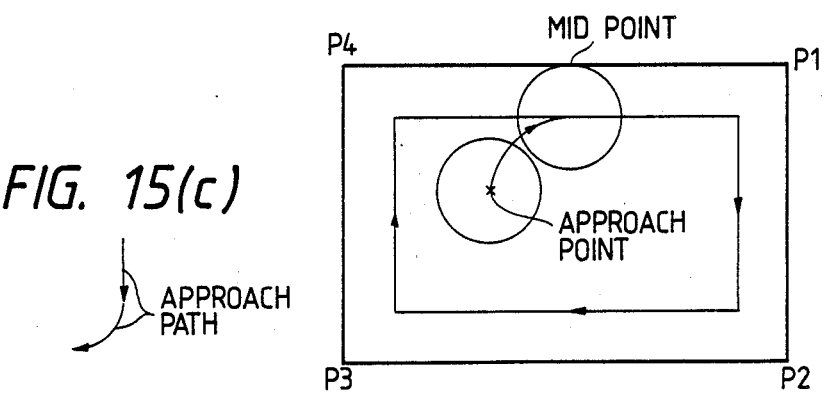

NUMERICAL CONTROL APPARATUS

BACKGROUND OF THE INVENTION

1. Field of the Invention

The present invention relates to a numerical control apparatus having a function which is available for both closed area (pocket) machining and open area machining, and more particularly to a numerical control apparatus capable of producing an offset figure for a machining tool, which has both an approach path to the offset figure and a retract path therefrom.

2. Description of the Prior Art

A conventional numerical control (NC) apparatus will now be described with reference to FIGS. 1(a) to 8(b).

FIG. 1(a) is a schematic diagram illustrating a workpiece before being machined and FIG. 1(b) is a schematic diagram illustrating a workpiece after being machined. FIG. 2(a) is a block diagram showing a hardware of the conventional NC apparatus; FIG. 2(b) is a diagram for showing an input data display on the CRT display shown in FIG. 2(a); and FIG. 2(c) is a diagram showing an input configuration obtained from the input data in FIG. 2(b). FIGS. 3(a) and 3(b) are diagrams showing data structure in a RAM section of a memory 2 of FIG. 2(a). FIGS. 4 and 5 are flowcharts of an operation of the conventional apparatus. FIGS. 6(a)–(c) are diagrams illustrating an approach path. FIG. 7 is a diagram showing an example of production of an approach path for directing a machine tool to the workpiece. FIG. 8(a) illustrates a workpiece to be machined, and FIG. 8(b) is a diagram illustrating possible approach paths to the workpiece of FIG. 8(a) with regard to problems accompanying the conventional apparatus.

In FIG. 2(a), reference numeral 1 designates a CPU, and the memory 2 includes a RAM and a ROM which store a control program for controlling the CPU 1 such as a machining program and the like. A keyboard 3 is used to input, into the memory 2, coordinates of a final machined version of a workpiece, data for machining and the like. A CRT 4 displays machining programs and picture images as shown in FIG. 2(b). A servo controller 5 converts displacement data from the CPU into the number of pulses for actually driving a servo motor 6 included in a machine tool 7.

Operation of the conventional apparatus will now be described as follows. The display 8 shown in FIG. 2(b) is first selected and displayed on the CRT display 4. The final machined version 9 of a workpiece as shown in FIG. 2(c) is input in the form of coordinates together with machining conditions, such as data concerning the tools to be used.

When a tool path provision key is pressed after all the data is input, the CPU 1 calculates the center of an arc, the radius of the art and the length of lines and stores this information in accordance with the data structure as shown in FIG. 3(a) in the RAM of the memory 2.

In FIG. 3(a), an indicator is data of about two bytes representing the category of a block or section of final machined version, for example in the form of data structure shown in FIG. 3(b). The variables x and y represent, respectively, coordinates of ends of the blocks or sections, such as a line and an arc, each variable being of 4 or 8 byte data depending on the system. When the block or section is an arc, the variables i and j indicate the x and y coordinates of the center of the arc, and k indicates a radius thereof. There the block or section is a straight line, the variables i, j, and k are assigned either no meaning or an equation representing a straight line.

In the case where a workpiece 10, as shown in FIG. 1(a), is to be machined to have a final machined version as shown in FIG. 1(b), input data for points P1 to P7 are stored in the memory 2 in accordance with the data structure shown in FIG. 3(a).

Then, an offset locus 11, which represents a locus of the center of the machining tool is produced as shown in FIG. 10(a). An offset figure (locus) 11 is formed, as shown in FIG. 7, by connecting points Q1 to Q7 which are points offset inwardly by an offset value equal to the radius of the tool used. The offset figure is a border line beyond which the center of machining is prevented from going. An approach path 12 is produced with respect to this offset FIG. 11 according to an operation flow shown in FIGS. 4 and 5.

In FIG. 4, points where vertical walls of the workpiece meet at an acute angle to form convex surface, such that an angle of a portion to be machined exceeds 180°, are searched in the closed curve of the offset FIG. 11 (step 101). If such a point is found, then a determination is made whether or not it is possible to approach the point (step 102). If possible, an approach path for entering a point next to the point perpendicularly thereto is produced as shown in FIG. 6(a) (step 103). If approach to the point is impossible, the searching operation is carried out to find the next such point. The term "impossible to approach" indicates that the length of that block or section (e.g., Q1-Q2. Q2-Q3, ..., Q7-Q1, in FIG. 7) is shorter than the radius of the tool, for example. A point where the surface is convex is first searched because a load on a machining tool is lowest in such an approach. In the case where there is no such point or there are no points to where approach is possible, then a searching operation is started to find a point that is located on a smoothly curved portion of the closed curve of the offset FIG. 1 (step 104). If a point located on a smoothly curved portion thereof is found, then a determination is made whether or not it is possible to approach the point (step 105). If possible, an approach path 12 is produced as shown in FIG. 6(b) (step 106). It should be noted that the reason why the smooth portion within the closed curve is searched secondly is because the load on the machining tool in this instance is relatively lower than the other portions, yet greater than the load on the machining tool for a point in a convex surface.

If the approach path 12 cannot be produced through the aforementioned steps, it means that either there are only concave portions, and/or there are only pints to which the approach paths cannot be produced. Then a determination is made whether or not there is a point between two concave portions (step 107). If there is a point therebetween, it is decided whether or not it is possible to approach that point (step 108). If possible then an approach path is produced as shown in FIG. 6(c) (step 109).

In the case where no approach paths can be produced through the aforementioned steps, a determination is made whether there is an error in the approach. This error means that the size of a workpiece to be machined is too small to develop an approach thereto.

In the case where a final workpiece shown in FIG. 1(b) is to be machined from a workpiece shown in FIG. 1(a), since the point P3 is a point where the surface of the workpiece is convex relative to adjacent sections, such an approach AP1·Q3 (a "" indicating a path connecting the two points) as shown in FIG. 7 is produced. Then, tool paths and other machining information are produced and machining information is output to the servo controller 5 for controlling the machine tool 7 to perform the machining of the workpiece.

With a conventional numerical control apparatus thus constructed, the approach path 12 is obtained without taking wall category of a final machined version into account, i.e., determining whether the vertical walls are real or imaginary, and therefore it is disadvantageous in that, in the case of machining a workpiece having a configuration as shown in FIG. 8, for example, due to the point AP being convex, there is a possibility that an approach path AP1·AP or AP2·AP may be produced, resulting in interference between the tool and the workpiece.

SUMMARY OF THE INVENTION

In view of the above difficulties accompanying the prior art, it is an object of the present invention to eliminate the difficulties accompanying the prior art systems and to provide a numerical control apparatus capable of producing an offset figure (a path for a machine to follow in order to produce a final machined workpiece) for a machining tool, which includes both approach and retract paths, based on input data for a final machined version and data concerning the wall category, without the need of providing various machining tools in open area machining or pocket machining.

These and other objects of the present invention are achieved by the provision of a numerical control apparatus which produces an offset figure for a machining tool and an approach/retract path therefore on the basis of data input by an operator in order to perform contour-machining including an apparatus for inputting the wall category of wall blocks or sections in a final machined version of a workpiece; and an apparatus for producing an offset figure and an approach/retract path on the basis of the call categories of the wall blocks or sections.

BRIEF DESCRIPTION OF THE DRAWINGS

In the accompanying drawings:

FIG. 2(a) is a diagram showing a hardware circuit arrangement;

FIG. 2(b) is a diagram showing an input picture;

FIG. 2(c) is a diagram showing an input of a workpiece;

FIG. 9(a) is a diagram showing an example of numerical control apparatus according to the present invention, which is substantially the same as the conventional apparatus;

FIG. 9(b) is a diagram illustrating an example of a display of an input data;

FIG. 9(c) is a diagram illustrating a final machined version of a workpiece obtained according to the input data shown in FIG. 9(b);

FIGS. 15(a) to 15(e) are diagrams illustrating how an approach path is produced;

DESCRIPTION OF THE PREFERRED EMBODIMENTS

Figure 10A:
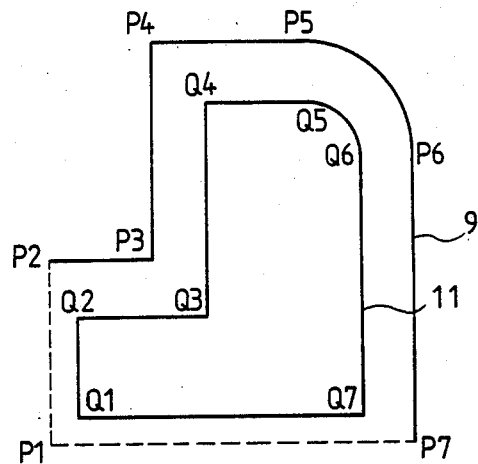
FIG. 10(a) is a diagram illustrating how an offset shape is produced.
Figure 10B:
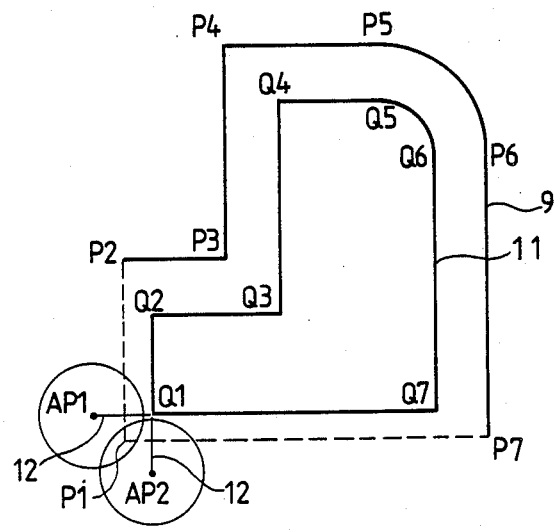
FIG. 10(b) is a diagram illustrating how a specific example of an approach path/retract path is produced.
Figure 11A:
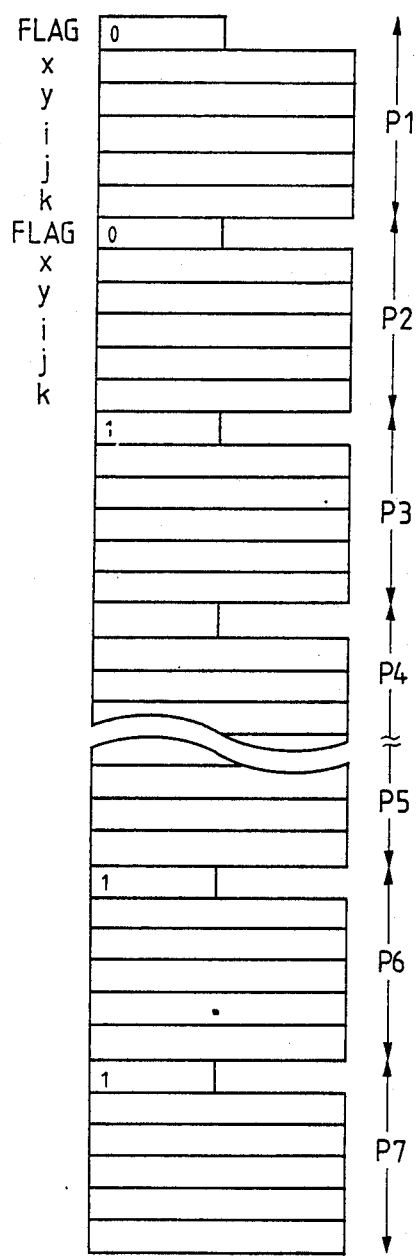
FIG. 11(a) is a diagram showing data structure of this RAM section of a memory.
Figure 11B:
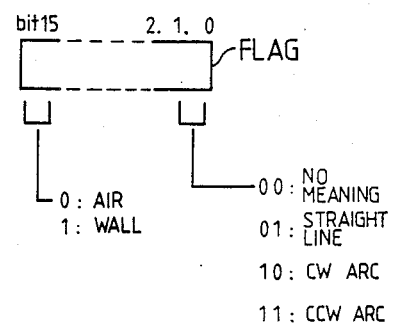
FIG. 11(b) is a diagram illustrating an indicator portion of FIG. 11(a)
Figure 12:
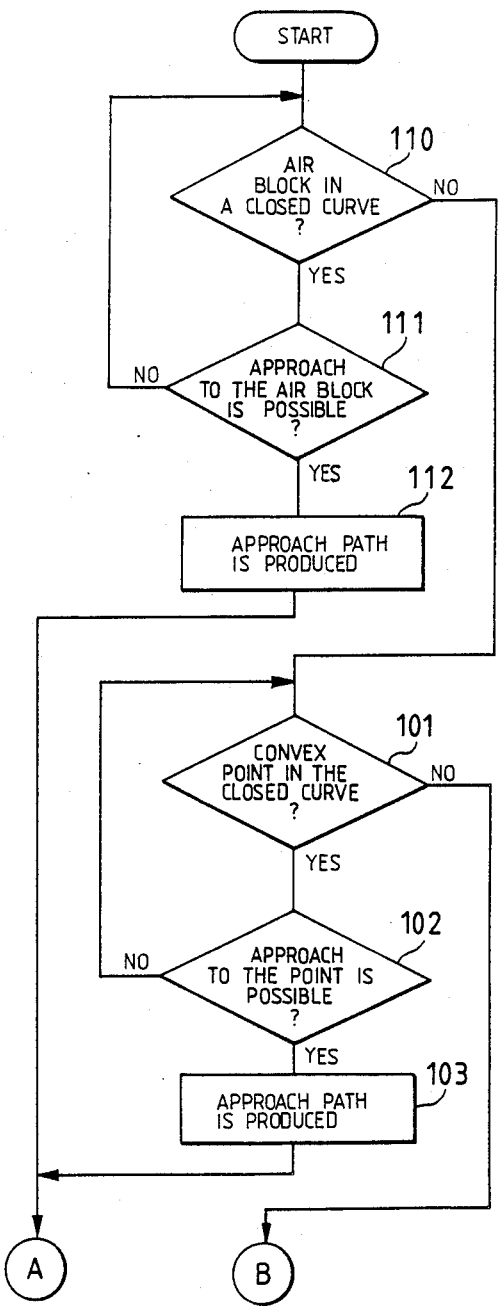
FIGS. 12 to 14 are flowcharts illustrating operation of producing an approach.
Figure 13:
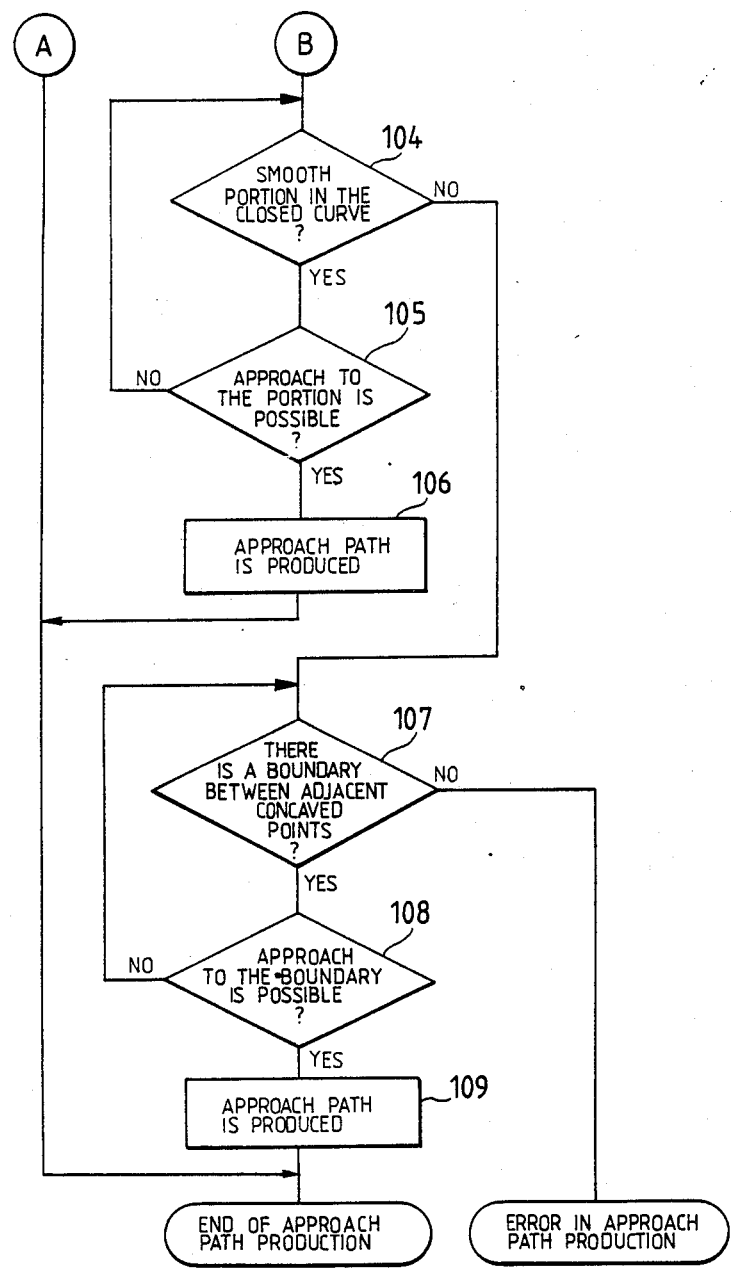
Figure 14:
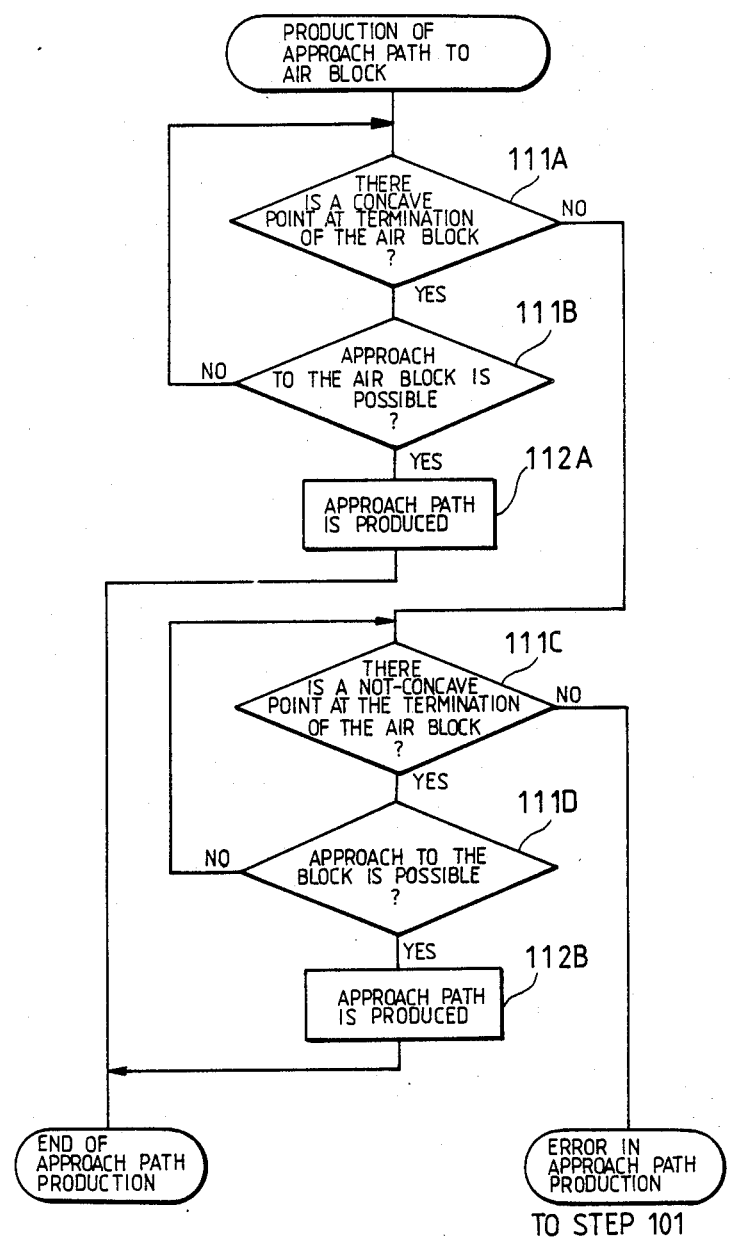

A first preferred embodiment will now be described with reference to FIGS. 9(a) to 15(c). FIG. 9(a) is a diagram showing an example of a numerical control apparatus according to the present invention, which is substantially the same as the conventional apparatus. FIG. 9(b) is a diagram illustrating an example of a display of input data. FIG. 9(c) is a diagram illustrating a final machined version obtained from the input data shown in FIG. 9(b). FIG. 10(a) is a diagram illustrating the production of an offset figure and FIG. 10(b) is a diagram for an example of an approach path. FIGS. 11(a) and 11(b) are diagrams showing an example of the data structure stored in a RAM section of a memory. FIGS. 12 to 14 are flowcharts for the operation of the control apparatus and FIGS. 15(a) to 15(c) are explanatory diagrams for an approach path.

Elements similar to or identical to those of the conventional apparatus bear the same reference numerals throughout the drawings.

A display 8 is first selected and displayed on a CRT display 4 as shown in FIG. 9(b). As is apparent from FIG. 9(b), the display 8 is adapted to include data relating to the wall category ("A" or "W") for wall blocks or sections of a workpiece. The A denotes an air wall, which is an imaginary block or section indicating that an edge of a horizontal surface of the workpiece has no vertical wall block extending therefrom. The W denotes a real wall, i.e., a real wall which extends from an edge of a horizontal surface. Referring to FIG. 10(a), for the wall category A, such as blocks or sections P7·P1 or P1·P2, the tools are allowed to go beyond the boundary or edge of the workpiece. For the wall category W, such as blocks or sections P2·P3, P3·P4, P4·P5, P5·P6 and P6·P7, the tools are prevented from going beyond the boundary or edge of the workpiece.

An operator inputs, by means of a keyboard 3, a final machined version 9 of a workpiece as shown in FIG. 9(c) in the form of coordinate values as well as tool data, where the respective coordinate values represent the ends of the respective block or section. In addition, the wall categories for the blocks are also input as shown in FIG. 9(b).

The CPU 1 produces data as to the respective points according to the data structure shown in FIG. 11(a) as in the conventional apparatus. In this case, indicator bits, for example a most significant bit, is assigned to indicate the wall category. A logic level, for example a logic level "1" indicates a real wall W, whereas a logic level "0" indicates an air or imaginary wall A.

An offset FIG. 11 is formed within the final machined version 9 as shown in FIG. 10(a), taking the radius of the tool, the wall category and so on into consideration. The offset FIG. 11 is obtained by connecting points Q1 to Q7 that are offset from the final machined version 9 by an offset value equal to the radius of the tools relative to the real walls and by an offset of not more than the radius of the tools relative to the air or imaginary walls.

Figure 20:
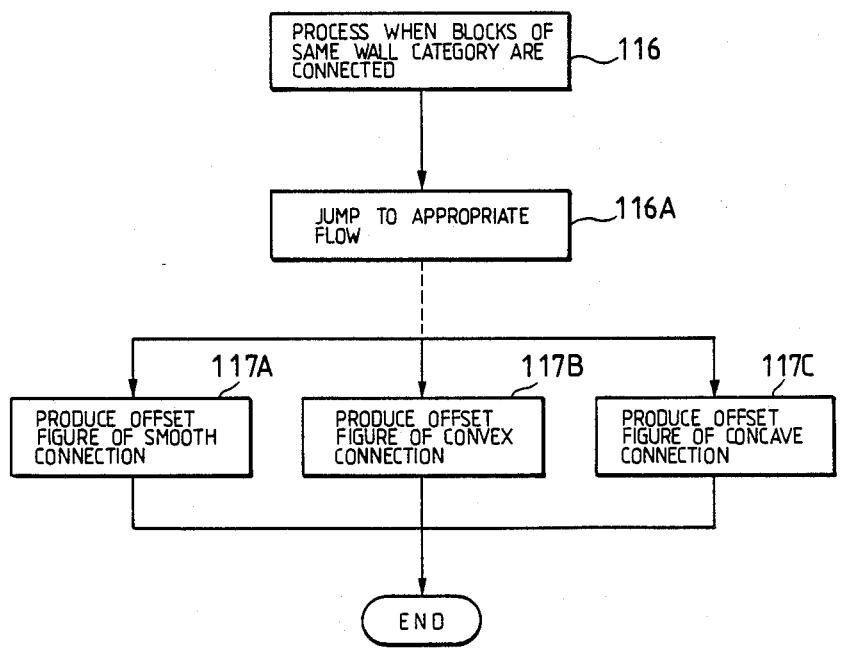
FIGS. 19 to 21 are flow charts for an operation for forming an offset figure.
Figure 19:
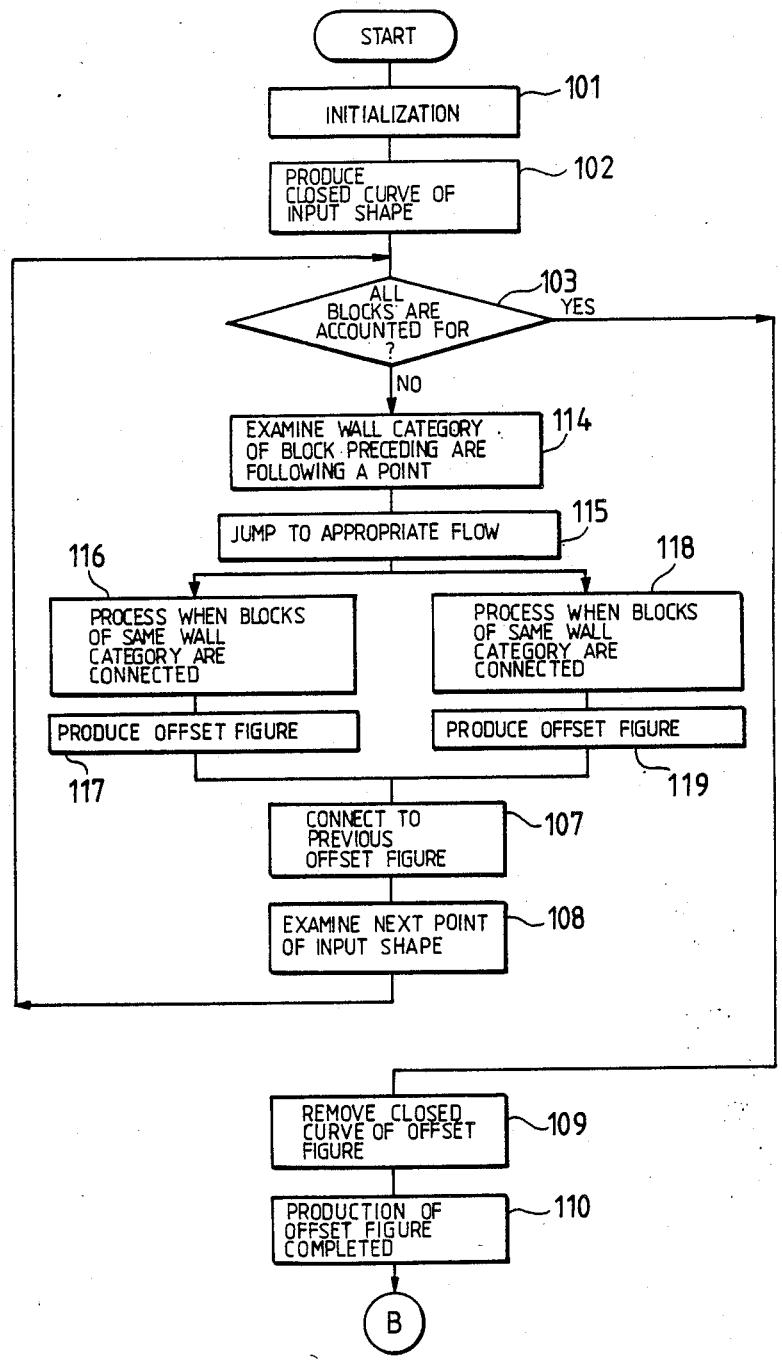
Figure 21:
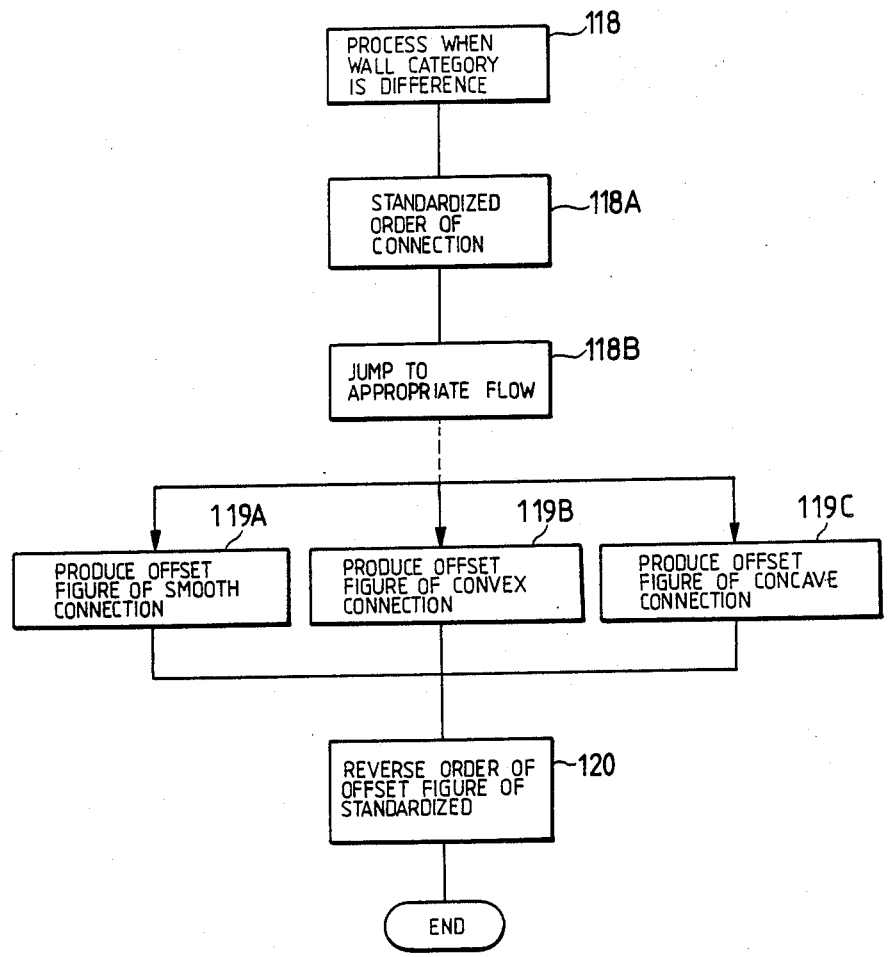

An example of the formation of the offset FIG. 11 will be described with reference to FIGS. 19 to 21 showing flow charts for an operation for forming the offset figure. In FIGS. 19 to 21, the apparatus is initialized (step 101), and a closed curve for a final machined version 10 is formed by repeating the data processing of the input data (step 102). A determination is made whether the offset figure, with respect to the thus formed final machined configuration, is completed or not (step 103). The wall category of a wall preceding and following a point is examined (step 114), and then the program jumps to an appropriate flow depending on the wall category thereof (step 115).

Figure 22A:
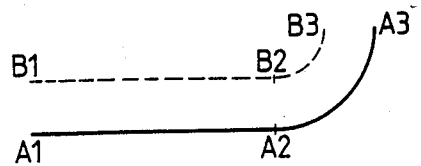
FIGS. 22(a) to 22(c) are diagrams showing an offset figure.
Figure 22C:
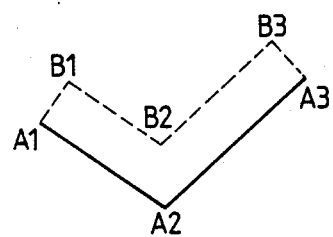
Figure 23C:
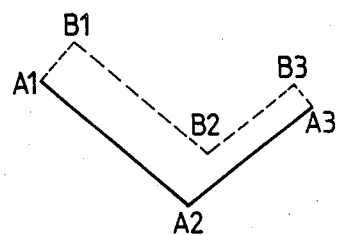

In the case where the wall blocks or sections having the same wall category are connected so as to be adjacent one another steps, 116 and 117 are carried out. On the other hand, in the case where blocks having different wall categories are connected step 118 and 119 are carried out. The process for the same type blocks, that is adjacent air walls or adjacent real walls, (referred to as A-A or W-W when applicable) is carried out in accordance with a flowchart shown in FIG. 20. The program jumps to an appropriate flow depending on how the blocks are connected (step 116A). Then if the blocks are connected in such a manner as to form a continuous linear contour, an offset figure is formed within the final machined version by an offset equal to the radius of a tool (for a W-W connection) or substantially equal to a half of the radius of a tool (for an A-A connection) as shown in FIG. 22(a) (step 117A). An offset figure is formed within the final machined version with an offset equal to the radius of a tool (for a W-W connection) or substantially equal to a half of the radius of a tool (for an A-A connection) as shown in FIG. 22(a) if the blocks are connected so as to form a convex contour (step 117B). An offset figure is formed within the final machined version by an offset equal to the radius of a tool (for a W-W connection) or substantially to a half of the radius of a tool (for an A-A connection) as shown in FIG. 22(c) if the adjacent blocks are connected to form a concave contour (step 117C).

Figure 23A:
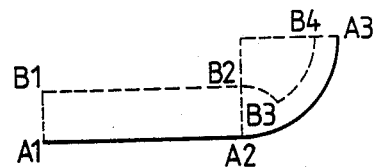
FIGS. 23(a) to 23(c) are diagrams showing the connecting condition between two wall blocks.
Figure 22B:
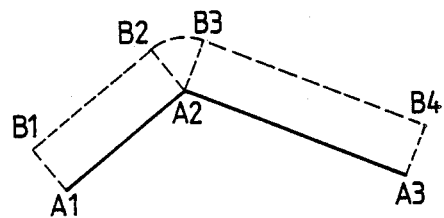
Figure 23B:
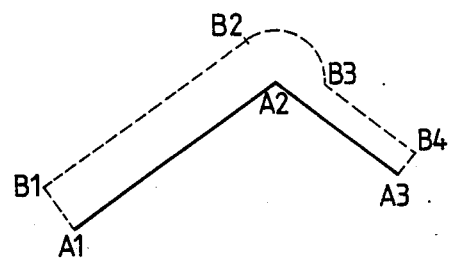

In the case where blocks of different wall categories are connected (W-A or A-W), the process is carried out as shown in FIG. 21. That is, the order of connecting points of the respective blocks are standardized (step 118A). Thereafter, the program jumps to an appropriate flow depending on how a block is connected to a preceding block or a following block (step 118B). Then, an offset figure is formed within the final machined version at an air wall A with an offset generally equal to a half of the radius of a tool as shown in FIG. 23(a) if the adjacent blocks are connected to form a continuous linear contour (step 119A). An offset figure is formed at the air wall A within the final machined version with an offset generally equal to a half of the radius of a tool as shown in FIG. 23(b) if the adjacent blocks are connected so as to form a convex contour (step 119B). Further, an offset figure is formed with the final machined version at the air wall A with an offset generally equal to a half of the radius of the tool if the blocks are connected to form a concave contour. Finally, the order of blocks, whose order of connection have been standardized, are reversed (step 120).

The order of the connecting points of the respective blocks is standardized by rearranging the order OF A-W to W-A, for example in the step 118A, in order to make it possible to carry out the formation of the offset figure more easily.

The further steps of the process are the same as those in the conventional apparatus and thus a detailed description therefor is omitted intentionally.

Figure 24A:
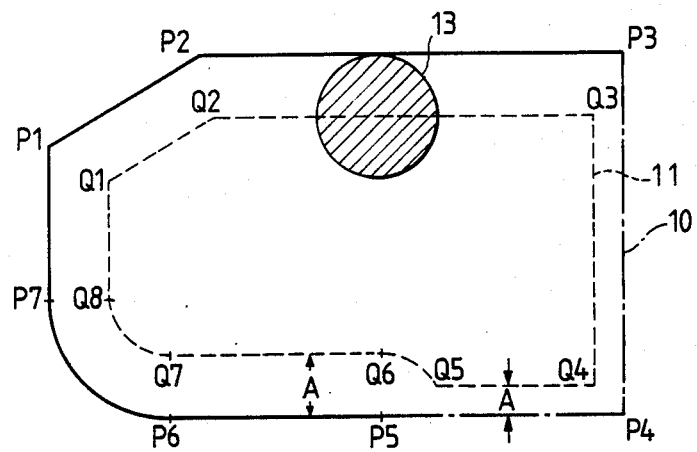
FIG. 24(a) is a diagram showing an offset figure.
Figure 24B:
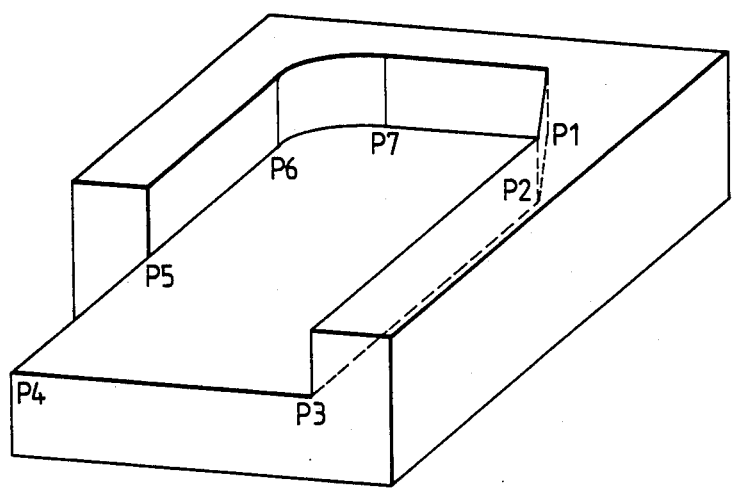
FIG. 24(b) is a schematic diagram showing a machined workpiece.
Figure 25:
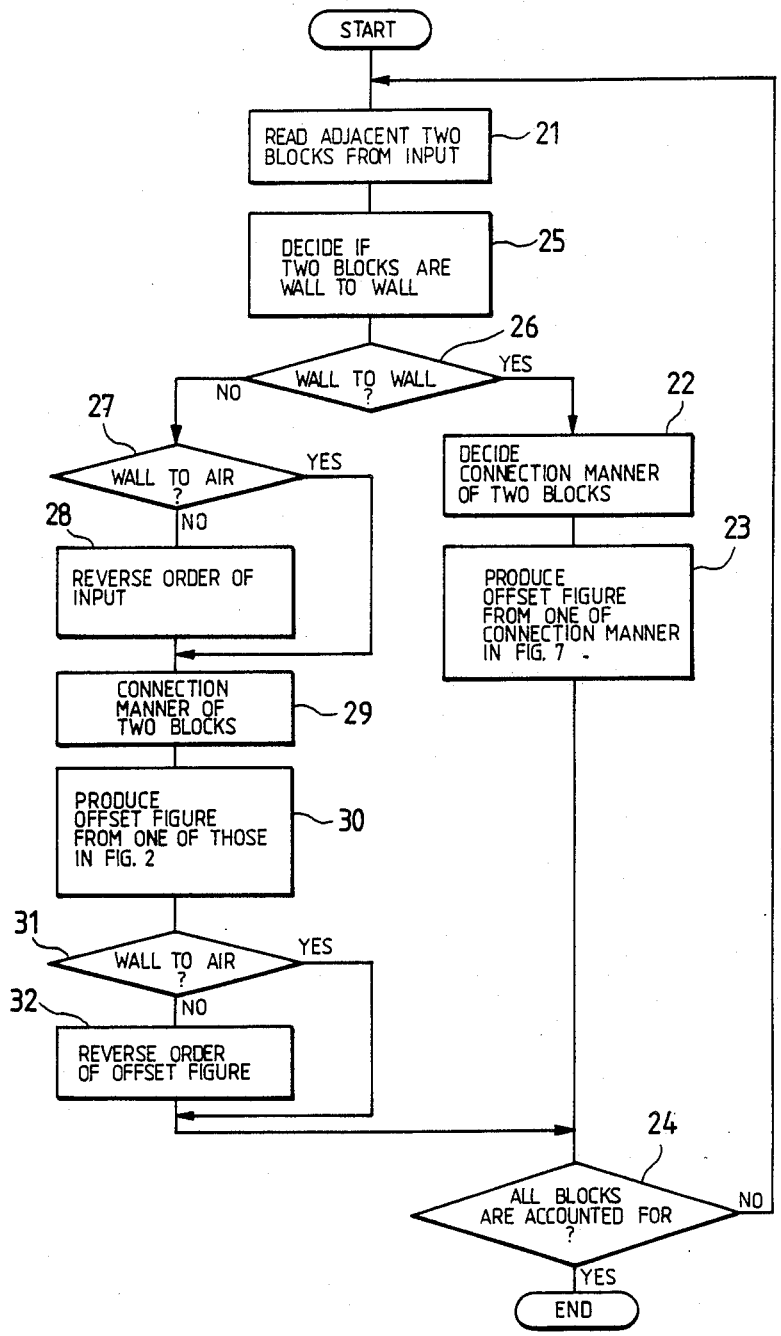
FIG. 25 is a flow chart for another embodiment of the present invention.
Figure 26:
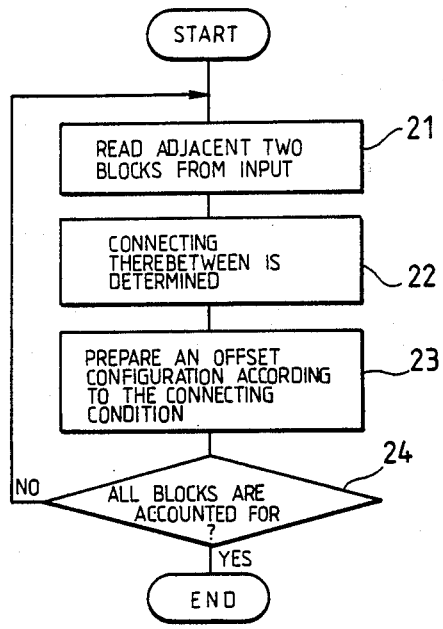
FIG. 26 is a flow chart for the other embodiment of the present invention.
Figure 27:
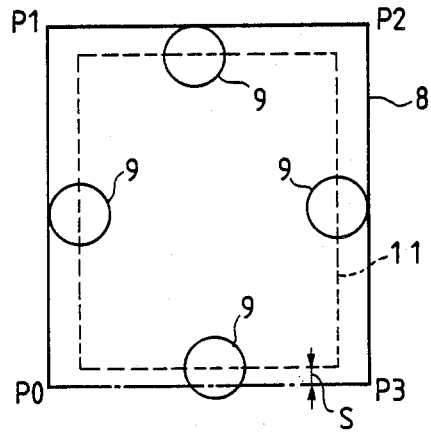
FIG. 27 is a diagram showing an offset figure.

Consequently, referring to FIG. 24(a), the offset figure formed according to the steps described is a figure in which a real wall section such as P5 to P3 is offset within the final machined version by an offset equal to the radius of a tool, and an air wall section such as P3 to P5 is offset within the ultimate machined configuration by an offset equal to a half of the radius of the tool. The tool path is produced on the basis of this offset figure. Accordingly, the workpiece can be machined to a desired configuration without any portion thereof left uncut as shown in FIG. 24(b).

An approach path is produced with respect to the offset FIG. 11 in accordance with a flowchart as shown in FIGS. 12 to 15(c).

In FIG. 12, an air or imaginary block in the closed curve of the offset FIG. 11 is first searched (step 110). If an air block exists, then it is decided whether it is possible to approach the air block or not (step 11).

The case where it is impossible to approach the air block means that the length of the air block is shorter than the radius of the machining tool.

If it is possible to approach the air block ("YES" in the step 111), an approach path is produced to the air block (step 112). This production of the approach path will be described in detail with reference to FIG. 14. If an air block is found, it is detected whether or not the air block is connected to the next block to form a concave contour (step 111A). If YES, that is the air block and the next block form a concave contour, a determination is made whether or not it is possible to produce an approach path (step 111B). If it is possible to produce such an approach path, the approach path is produced to enter the next block perpendicularly. In other words, the approach path is produced on an extended line of the offset FIG. 11 to the next block as shown in FIG. 15(a) (step 112A).

In the case where it is determined that an approach path cannot be produced at the steps 111A and 111B, it is determined whether or not there is a non-concave contour at the end of the air block (step 111C). If YES, that is if it is possible to approach, a quarter arc of a circle having the same radius as that of the tool is produced from the air block as an approach path as shown in FIG. 15(b). The starting point of the arc may be extended as shown in FIG. 15(c).

If the approach path to the air block cannot be produced in this manner, the approach path is produced in the same manner as the conventional apparatus (steps 101 to 109).

If the formation of the approach path to a certain point is impossible, a searching operation for a convex contour is then started. If no convex contour is found in the closed loop offset figure, or there are no convex contours to which the approach path can be produced, a searching operation for a continuous linear contour is then started. If a point in a continuous linear contour to which the approach is possible is found, an approach path as shown in FIG. 15(b) is produced. If there is no continuous linear portion, it means that there are only concave contours or points impossible to approach in the closed loop offset figure. In this case, the approach is attained to a mid point of two consecutive points as shown in FIG. 15(e).

FIG. 10(b) is a diagram showing the tool path including the approach path which is produced in accordance with the steps described above. In FIG. 10(b), AP1 denotes an approach point when machining is performed in the CCW (counterclockwise) direction and AP2 denotes an approach point when machining is performed in the CW (clockwise) direction.

Although only the formation of an approach path is discussed with regard to the first embodiment, the present invention is available for a retract path (a locus of a tool when leaving the workpiece after machining of a block is completed). In such a case, a retract path may be produced in the form of a path perpendicular to or a quarter arc which starts from the block preceding the air block that is approached. For example, if the machining is performed in the CW direction, AP2·Q2 is an approach path and Q7·AP1 is a retract path in FIG. 10(b). As is clear from the above, the present inVention permits the production of approach paths in which there occurs no interference between the tools and the workpiece to be machined.

The first embodiment may have a disadvantage that an approach path which results in a waste in the length of time for a cutting period may be produced, depending on the configuration of a workpiece.

Figure 1A:
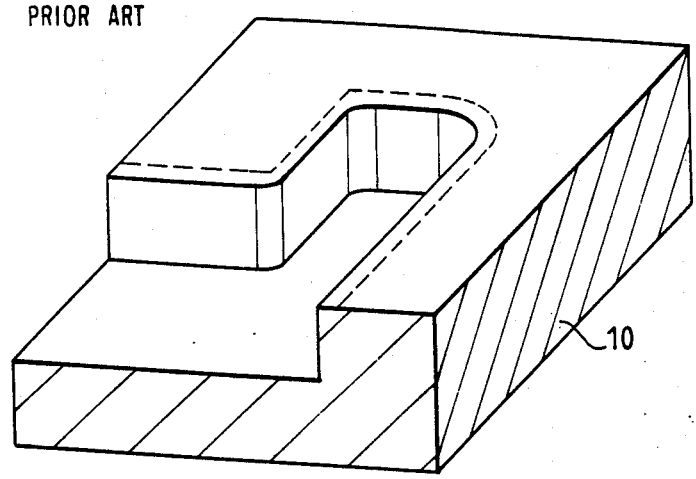
FIG. 1(a) is a diagram showing a specific workpiece before it is machined.
Figure 1B:
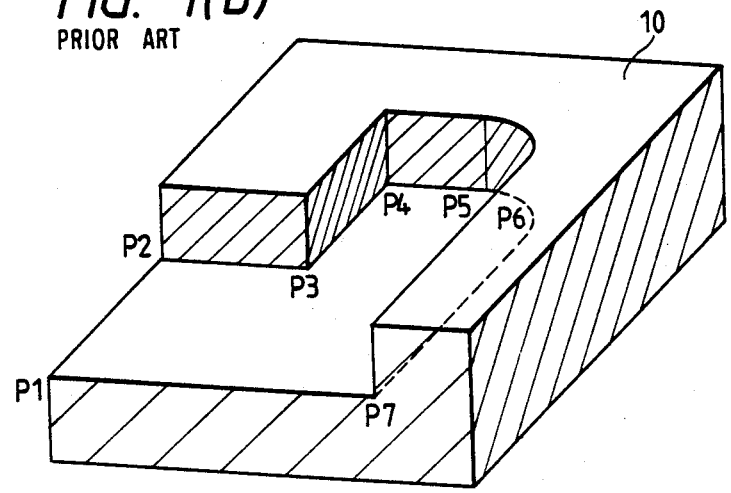
FIG. 1(b) is a diagram showing the specific workpiece after it is machined.
Figure 3A:
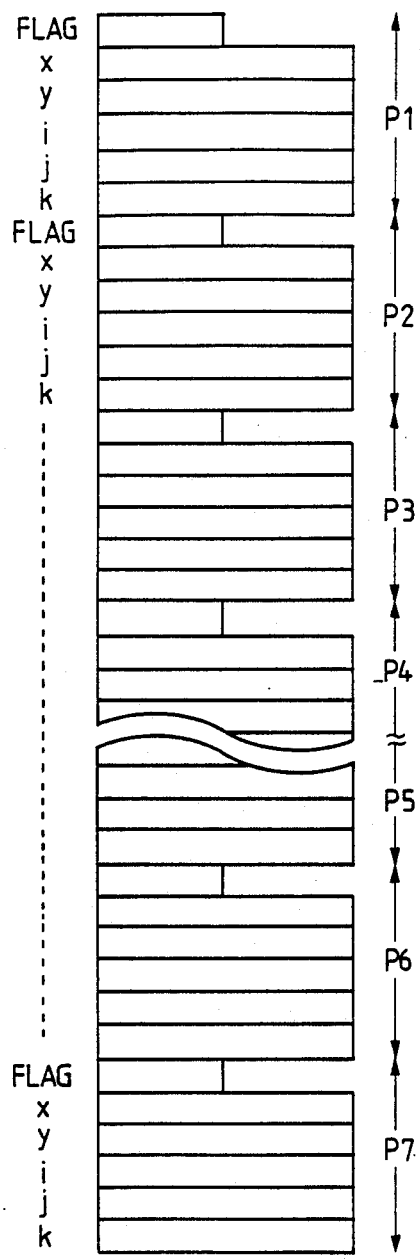
FIG. 3(a) is a diagram showing a data structure of RAM section of a memory.
Figure 3B:
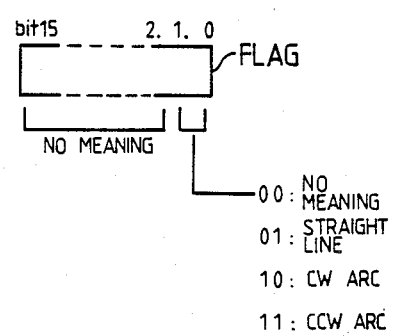
FIG. 3(b) is a diagram illustrating an indicator portion of FIG. 13(a)
Figure 4:
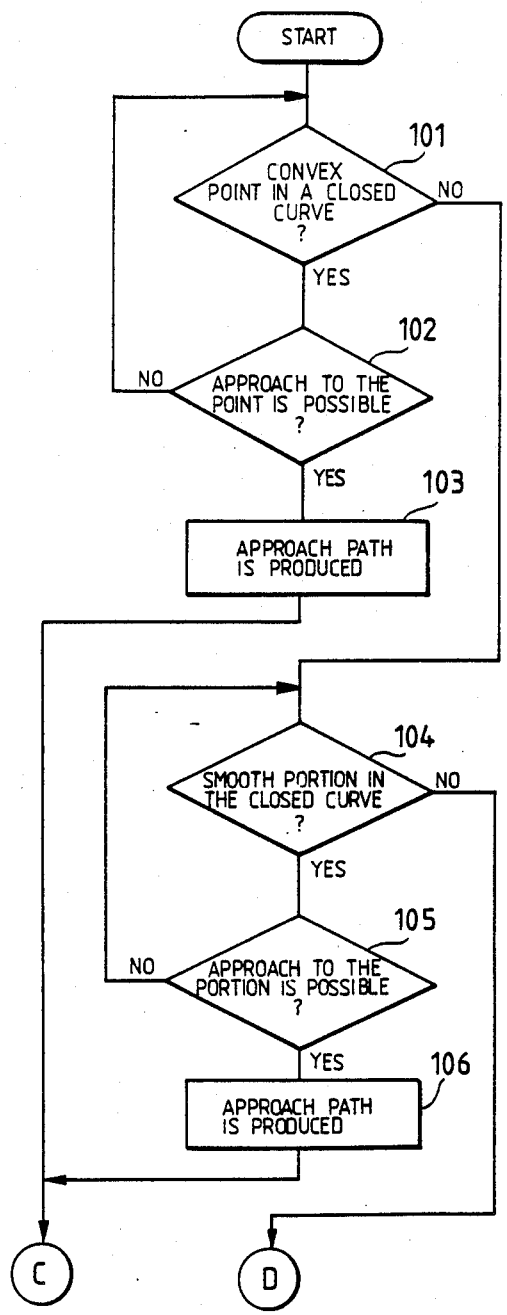
FIGS. 4 and 5 are flowcharts illustrating operation of the apparatus of FIG. 2(a)
Figure 5:
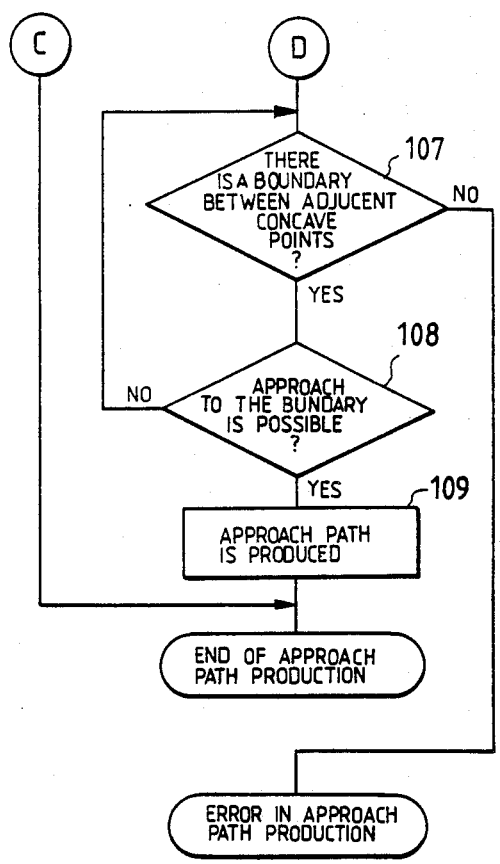
Figure 6A:
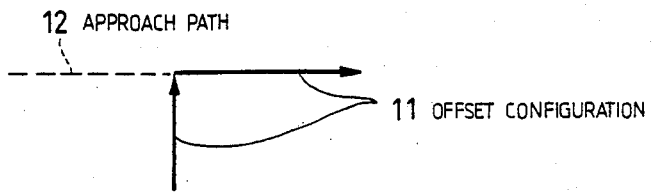
FIG. 6(a)–(c) is a diagram illustrating how an approach path is produced.
Figure 6B:
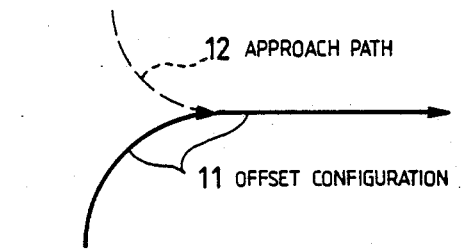
Figure 6C:
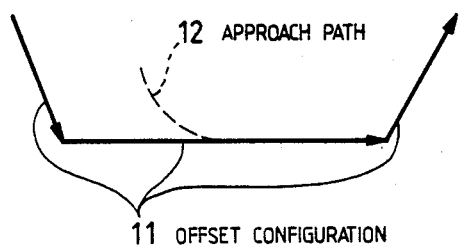
Figure 7:
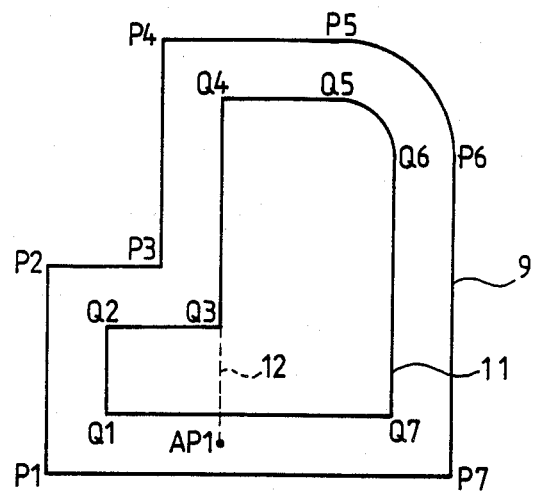
FIG. 7 is a diagram showing a specific example of how an approach path is produced.
Figure 8A:
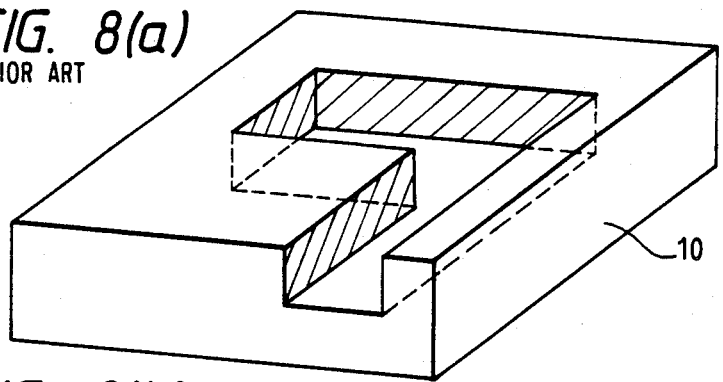
FIG. 8(a) is a diagram of a workpiece to be machined.
Figure 8B:
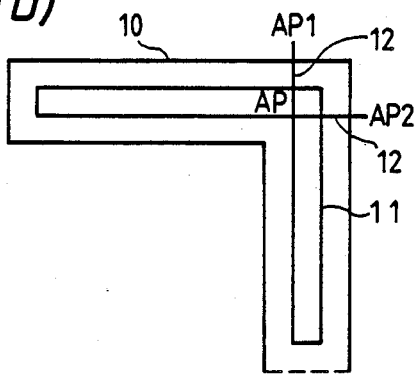
FIG. 8(b) is a diagram illustrating possible paths to the workpiece of FIG. 8(a) and deficiencies of a prior art apparatus.

An example of the approach path for a workpiece shown in FIG. 1(b) is as shown in FIG. 10(b). In such an example, the travel of the tool from the point AP2 to Q2 in the CW machining direction and the travel of the tool from the point AP1 to Q7 in the CCW machining direction are carried out under a so-called "air-cutting" condition, i.e., the tool does not machine the workpiece during the travel of the tool. This results in a longer period of time for machining.

Figure 17:
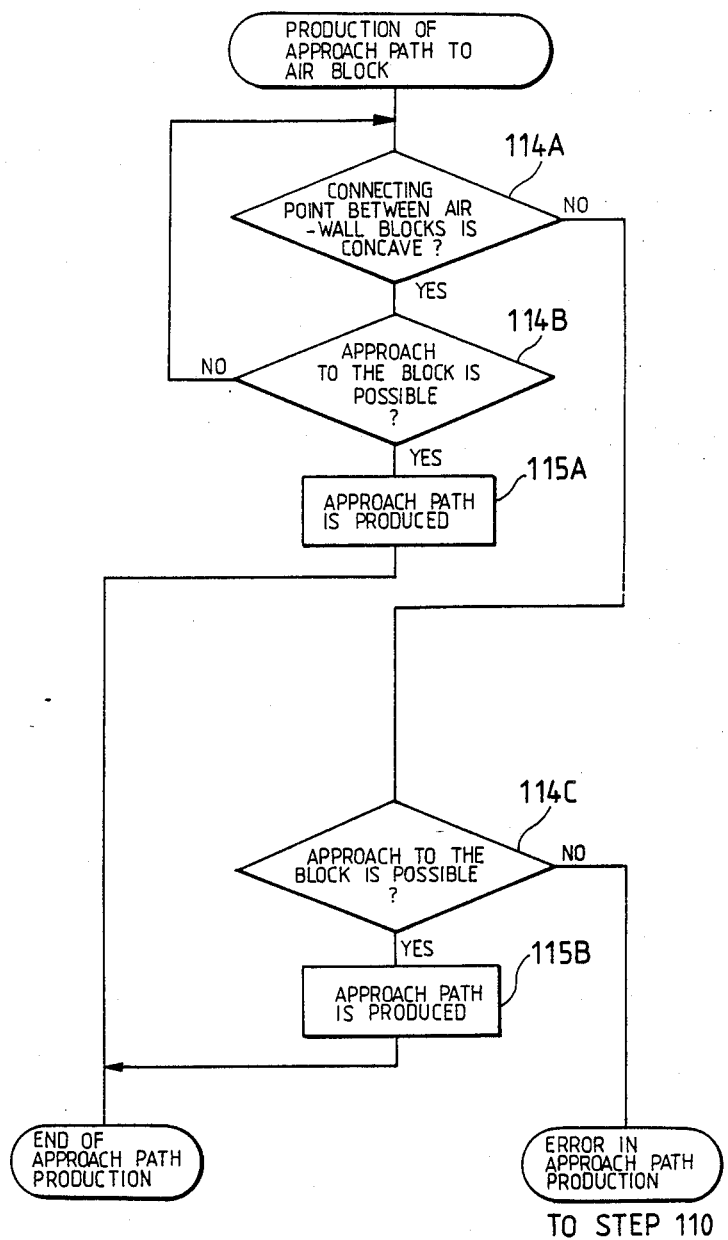
Figure 18:
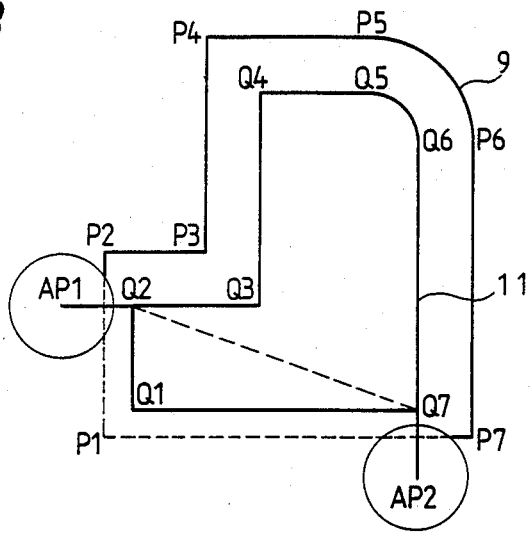
FIG. 18 is a diagram illustrating a specific example of producing an approach path/retract path.

In such cases, the longer period of time can be prevented by the formation of the approach path as shown in FIG. 18. In FIG. 18, the approach point is positioned at a start point of a wall block connected at the end of an air block. More specifically, in FIG. 18, assuming that Q1 is the start point, the point Q2 is the end of the air wall block as well as the start point of the real wall block if the machining is performed in the CW direction, whereas the point Q7 is the end of the air wall block as well as the start point of the real wall block if the machining is performed in the CCW direction. The formation of an approach path as shown in FIG. 18 can be carried out according to the operation shown in FIGS. 16 and 17.

Figure 16:
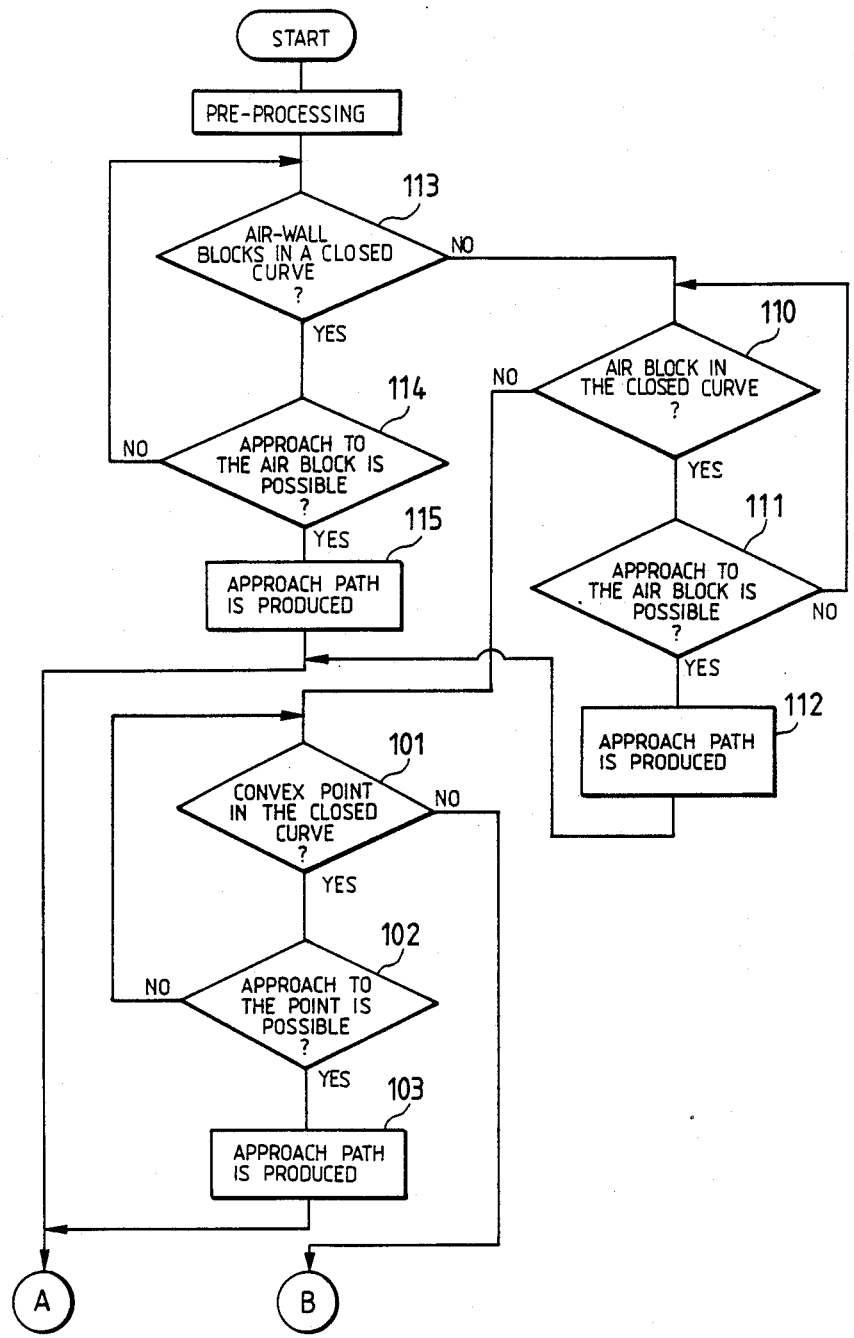
FIGS. 16 and 17 are flowcharts illustrating operation of producing an approach.

In FIG. 16, a determination is made whether or not an air block followed by a wall block exists within a closed curve of an offset FIG. 11 (step 113). If such a block exists, it is determined whether or not it is possible to approach that block (step 114). The fact that it is impossible to approach the block means that the diagonal distance (indicated by a dotted line in FIG. 189) to the end of the wall block before the air block of interest is shorter than the diameter of the tool.

Referring to FIG. 17, which shows steps for producing an approach path, if an air block followed by a real wall block (air wall to real wall block) is found, it is determined whether or not the air block is connected to the real wall block so as to form a concave contour step 114A). If such a point exists, a determination is made whether or not it is possible to produce an approach path leading to the air block (step 114B). If it is possible to produce the approach path, an approach path is produced to enter the air wall block perpendicularly thereto as shown in FIG. 15(a), in other words on a extended line of the real wall of the offset figure (step 115A).

A determination that the formation of an approach path is impossible in steps 114A and 114B, means that the blocks are connected so as to form a continuous linear contour. In this case, it is determined whether or not it is possible to produce an approach path to the block (step 114C). If it is possible to produce an approach path a quarter arc of a circle having the same radius as the tool which starts from the air block, is produced as an approach path as shown in FIG. 15(b). The start point of the arc may be extended further as shown in FIG. 15(c).

FIG. 18 shows a tool path including an approach path which is produced in accordance with the steps shown in FIGS. 16 and 17. In FIG. 18, AP1 denotes an approach point if the machining is to be performed in the CW direction and AP2 denotes an approach point if the machining is to be performed in the CCW direction. In the case where the approach path cannot be produced, then the apparatus attempts to produce an approach path in accordance with steps of the first embodiment previously described, and if the approach path still cannot be produced, the approach path will be produced in the same manner as the conventional apparatus.

Although the formation of the approach paths is discussed in the aforementioned second embodiment, the embodiment can also be applied to producing retract paths. A connecting point located between an air block, preceded by a real wall block, and the real wall block is searched, and then a retract path is produced with respect to that connecting point. For example in FIG. 18. AP1·Q2 is an approach path and Q7·AP2 is a retract path.

According to the present invention, an offset machining path and approach and retract paths for machining tools are produced on the basis of wall categories of sections of a workpiece thereby resulting in prevention of interference between the tools and the workpiece. Further, an approach path can be produced at a portion where actual cutting takes place, and thus a numerical control apparatus having a short machining time can be implemented.

What is claimed:

1. A numerical control apparatus which produces at least one of an approach path and a retract path by which a tool is directed to contact a workpiece to be machined based on input data to perform contour-machining, comprising:
   means for inputting whether wall sections of a final machined version of said workpiece are one of air wall sections and real wall sections;
   means for producing said at least one of said approach path and said retract path based on said wall category of said wall sections.

2. A numerical control apparatus as defined in claim (1), further comprising first means for detecting if two adjacent wall sections meet at an acute angel to form a convex contour,
   wherein said producing means produces said at least one of said approach path and said retract path to said convex contour of said final machined version of said workpiece.

3. A numerical control apparatus as defined in claim (2), further comprising second means for detecting if two adjacent wall sections meet to form a continuously linear contour,
   wherein said producing means produces said at least one of said approach path and said retract path to continuously linear contour of said final machined version of said workpiece, when said first means does not detect said convex contour.

4. A numerical contour apparatus as defined in claim (3), wherein said producing means produces said at least one of said approach path and said retract path to a mid point of one of said wall sections when said first means does not detect said convex contour and second means does not detect continuously linear contour.

5. A numerical control apparatus which produces at least one of an approach path and a retract path by which a tool is directed to contact a workpiece to be machined based on input data to perform contour-machining, comprising:
   means for inputting a wall category for a wall section of a final machined version of said workpiece;
   means for determining whether said wall category is one of an air wall section and a real wall section;
   means for deciding whether or not said at least one of said approach path and said retract path can be produced to said air wall section upon the detection of said air wall section; and
   means for producing said at least one of said approach path and said retract path to said air wall section when said deciding means decides that said at least one of said approach path and said retract path can be produced.

6. A numerical control apparatus which produces at least one of an approach path and a retract path by which a tool is directed to contact a workpiece to be machined based on input data to perform contour-machining, comprising:
   means for inputting wall categories for wall sections of a final machined version of said workpiece;
   means for searching said wall categories for an air wall;
   means for deciding whether or not said at least one of said approach path and said retract path can be produced to said air wall section adjacent said real wall section when said air wall section adjacent said real wall section is detected; and
   means for producing said at least one of said approach path and said retract path to said air wall section adjacent said real wall section when said deciding means decides that said at least one of said approach path and said retract path can be produced.

7. A numerical control apparatus for machining a workpiece to have a final machined version having walls which form concave contour, comprising:
   means for inputting data for machining;
   means for producing an offset figure corresponding to said final machined version, said offset figure being spaced apart from said final machined version; and
   means for producing a tool path based on an output of said offset figure producing means;
   wherein an said offset figure is spaced from said final machined version by a distance which is varied in accordance with whether wall sections of said workpiece in said final machined version are one of air walls and real walls.

8. A numerical control apparatus according to claim (7), wherein said offset figure producing means comprises:
   means for detecting whether said wall categories of said workpiece, which are input by said inputting means are one of real walls and air walls; and
   means for producing said offset figure, wherein said distance, when one of said wall categories is an air wall, is less than said distance when one of said wall categories is a real wall.

9. A numerical control apparatus having an area machining function comprising:
   means for inputting first data for a final machined version of a workpiece, which has walls which form concave contour;
   means for reading said first data to obtain second data concerning two adjacent wall sections of said concave contour;
   first means for determining, based on said second data, whether said two adjacent wall sections are both real walls;
   means for processing said first data as a closed area when it is determined that any two adjacent wall sections are both real walls;
   second means for determining, based on said second data, whether said two adjacent wall sections comprise an air wall followed by a real wall, when said first means determines that said two adjacent wall sections are not both real walls;
   third means for determining an order of said real wall section and said air wall section, and how said two adjacent wall sections connect; and
   means for processing said sections as an open area when it is determined that said two adjacent wall sections comprise a real wall followed by an air wall.

* * * * *